(12) United States Patent
Zhu et al.

(10) Patent No.: US 10,156,781 B2
(45) Date of Patent: Dec. 18, 2018

(54) SPONTANEOUS POP-UP DISPLAY DEVICE

(71) Applicant: Arovia, Inc., Houston, TX (US)

(72) Inventors: Shengliang Zhu, Houston, TX (US);
Alexander David Wesley, Houston, TX (US)

(73) Assignee: Arovia, Inc., Houston, TX (US)

( * ) Notice: Subject to any disclaimer, the term of this patent is extended or adjusted under 35 U.S.C. 154(b) by 0 days.

(21) Appl. No.: 15/761,431

(22) PCT Filed: Oct. 21, 2016

(86) PCT No.: PCT/US2016/058055
§ 371 (c)(1),
(2) Date: Mar. 20, 2018

(87) PCT Pub. No.: WO2017/070435
PCT Pub. Date: Apr. 27, 2017

(65) Prior Publication Data
US 2018/0284589 A1    Oct. 4, 2018

Related U.S. Application Data

(60) Provisional application No. 62/317,552, filed on Apr. 3, 2016, provisional application No. 62/244,298, filed on Oct. 21, 2015.

(51) Int. Cl.
*G03B 21/14*     (2006.01)
*G03B 21/58*     (2014.01)
(Continued)

(52) U.S. Cl.
CPC ............. *G03B 21/58* (2013.01); *G03B 21/10* (2013.01); *G03B 21/11* (2013.01); *G03B 21/62* (2013.01); *G06F 3/041* (2013.01)

(58) Field of Classification Search
CPC ...... G03B 21/14; G03B 21/10; G03B 21/145; G03B 21/58
(Continued)

(56) References Cited

U.S. PATENT DOCUMENTS 3,144,889 A    8/1964  La Mar
3,144,899 A *  8/1964  Stewart ................. G03B 21/58
                                              160/24

(Continued)

FOREIGN PATENT DOCUMENTS

DE     20302079 U1    7/2003
DE     10305497 A1    8/2004
(Continued)

*Primary Examiner* — William C Dowling
(74) *Attorney, Agent, or Firm* — Cecil Alan McClure

(57) ABSTRACT

The present invention provides an improved collapsible portable, display device. The improved collapsible, portable display device, has a housing having a sliding member aligned on the exterior of the housing and sliding along the exterior of said housing between two operating positions, a collapsible screen capable of displaying an image when in an expanded operating position, and multiple collapsible members connected to said screen and connected to said sliding member and said housing, and the collapsible members move said screen between the collapsed and expanded operating positions as said sliding member moves between a first collapsed operating position and a second popped-up position.

27 Claims, 13 Drawing Sheets

(51) Int. Cl.
*G03B 21/62* (2014.01)
*G03B 21/10* (2006.01)
*G03B 21/11* (2006.01)
*G06F 3/041* (2006.01)

(58) Field of Classification Search
USPC .................................................. 353/79, 119
See application file for complete search history.

(56) References Cited

U.S. PATENT DOCUMENTS

| | | | |
|---|---|---|---|
| 3,560,088 A * | 2/1971 | Schwartz | G03B 21/10 |
| | | | 353/119 |
| 4,323,301 A | 4/1982 | Spector | |
| 4,432,619 A * | 2/1984 | Schmidt | G03B 21/30 |
| | | | 353/119 |
| 4,572,632 A | 2/1986 | Bodier et al. | |
| 5,510,862 A * | 4/1996 | Lieberman | G03B 21/10 |
| | | | 353/119 |
| 5,838,493 A | 11/1998 | Furuya | |
| 6,034,717 A | 3/2000 | Dentinger et al. | |
| 6,191,886 B1 * | 2/2001 | Sinkoff | G03B 21/58 |
| | | | 160/24 |
| 6,297,905 B1 * | 10/2001 | Takamoto | G03B 21/58 |
| | | | 359/443 |
| 6,466,369 B1 | 10/2002 | Maddock | |
| 6,637,896 B2 | 10/2003 | Li et al. | |
| 6,873,460 B1 | 3/2005 | Burstyn et al. | |
| 8,313,199 B2 | 11/2012 | Hirata | |
| 2004/0057109 A1 | 3/2004 | Edney | |
| 2005/0174638 A1 | 8/2005 | Kotera | |
| 2006/0077356 A1 | 4/2006 | Merczak | |
| 2006/0232610 A1 | 10/2006 | Lee et al. | |
| 2006/0234784 A1 | 10/2006 | Reinhorn | |
| 2007/0171375 A1 | 7/2007 | Mizuuchi et al. | |
| 2009/0190212 A1 * | 7/2009 | Wang | G03B 21/58 |
| | | | 359/461 |
| 2010/0007950 A1 * | 1/2010 | Yuzawa | G03B 21/56 |
| | | | 359/461 |
| 2010/0045569 A1 | 2/2010 | Estevez et al. | |
| 2011/0132557 A1 * | 6/2011 | Kuroi | G03B 21/58 |
| | | | 160/368.1 |
| 2011/0242601 A1 | 10/2011 | Kepley, Jr. | |
| 2012/0249980 A1 * | 10/2012 | Kepley, Jr. | G03B 21/10 |
| | | | 353/79 |
| 2013/0128238 A1 * | 5/2013 | Estevez | G03B 21/10 |
| | | | 353/79 |

FOREIGN PATENT DOCUMENTS

| | | |
|---|---|---|
| JP | 05-224300 | 9/1993 |
| JP | 07-113999 | 5/1995 |
| JP | 2001-56504 | 2/2001 |
| JP | 2004-240501 | 8/2004 |
| JP | 2005-331898 | 2/2005 |
| JP | 2007264282 A | 10/2007 |
| JP | 2003101909 A | 11/2007 |
| JP | 2008-070748 | 3/2008 |
| JP | 2008-070749 | 3/2008 |
| JP | 2008065018 A | 1/2009 |
| JP | 2009-109812 | 5/2009 |
| JP | 2015-49483 | 5/2009 |
| JP | 2000010196 A | 9/2009 |
| JP | 2011095303 A | 5/2011 |
| JP | 2012118548 | 6/2012 |
| JP | 2013142852 A | 7/2013 |
| JP | 2015-49483 | 3/2015 |
| NL | 1033809 C2 | 11/2008 |
| WO | WO 2016013785 A1 * | 1/2016 ............. G03B 21/58 |
| WO | WO 2016154481 A1 * | 9/2016 ............. G03B 21/10 |

* cited by examiner

US 10,156,781 B2

SPONTANEOUS POP-UP DISPLAY DEVICE

This application claims priority under 35 USC 119(a)(1) of Provisional Applications: 62/244,298, filed on Oct. 21, 2015, and 62/317,552, filed on Apr. 3, 2016.

TECHNICAL FIELD OF THE INVENTION

This invention relates to portable, collapsible display devices.

BACKGROUND OF THE INVENTION

Displays have been used in multiple sizes and configurations in conference rooms, homes, hotels, offices, and other locations for showing information. Such displays may be portable or built into a room, like a conference room. In addition, projection televisions and other projectors are used for larger audiences. There are also small projector systems that are available for displaying information.

SUMMARY OF THE INVENTION

The present invention is a collapsible display device, where the device can be stored in a compact portable form and pop-up to provide a large screen when in use. The device may optionally include a built in projector. The SPUD (Spontaneous Pop-Up Display) invention has multiple embodiments.

These and other features of the invention will become apparent to those skilled in the art from the following detailed description of the invention, taken together with the accompanying drawings.

DETAILED DESCRIPTION

Figure 1:
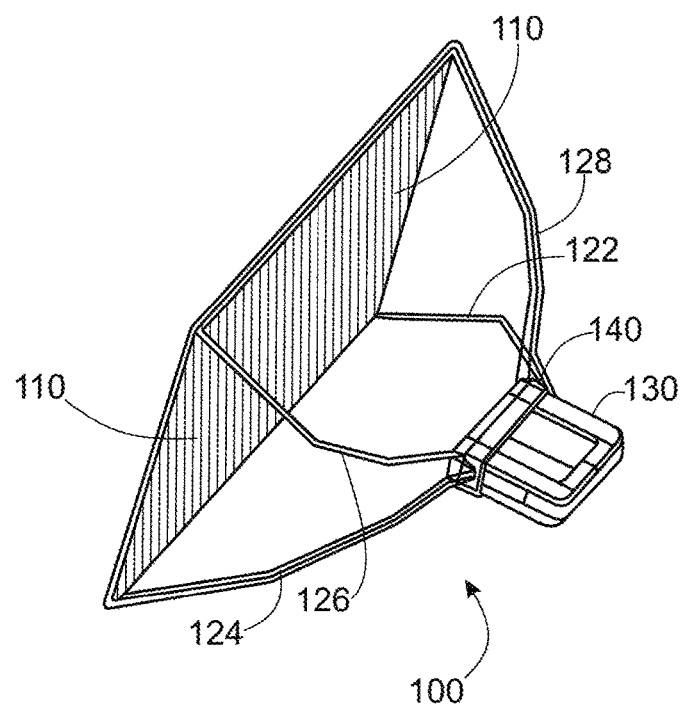
FIG. 1 depicts a perspective, partially cut away view of the general arrangement of one embodiment of the collapsible, portable display of the present invention with the collapsible folding arms of a prototype in the fully extended operating position.
Figure 2:
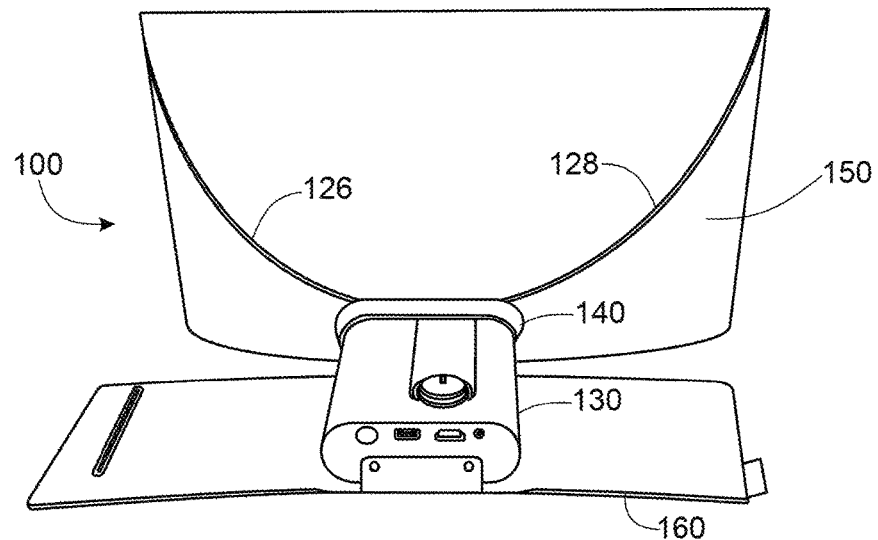
FIG. 2 depicts a rear view of the general arrangement of one embodiment of the collapsible, portable display of the present invention when in the popped-up or fully extended operating position.

The present invention is a Spontaneous Pop-Up Display (SPUD) device. The SPUD is a collapsible display device, where the device can be stored in a compact portable form and then pops-up to provide a large screen when in use. FIGS. 1 and 2 depict embodiments 100 of the collapsible, portable display of the present invention.

Referring now to FIG. 1, there may be seen one embodiment of the collapsible, portable display 100 of the present invention in a popped-up or fully extended operating position. More particularly, it may be seen that this embodiment 100 has a fully extended, or popped-up, display screen 110 and four collapsible arms 122, 124, 126, 128 attached at the corners of the screen and that each of the arms are also attached to a corresponding location on a main body portion 130. Each arm has two attachment points on the body. One rotatable attachment of each arm is to a fixed non-moving portion of the body 130, and the other rotatable attachment of each arm is to a moveable sliding member 140 disposed on or around the main body or housing that is described in more detail later herein. Note that each arm has two joints that allow for collapsing the arms and the screen as described in more detail later herein. However, each arm may have more than two joints or fewer than two joints.

Referring now to FIG. 2, there may be seen a rear perspective view of the general arrangement of one embodiment of the collapsible, portable display device when in the popped-up or fully extended operating position. More particularly, it may be seen that this embodiment 100 has a fully extended popped-up display screen (not visible in this view, but see FIG. 1) and four collapsible arms (two of which are labelled as 126, 128, and are not visible but may be seen FIG. 1) attached at the corners of the screen and that each of the arms are also attached to corresponding locations on a main body portion 130.

There may also be seen a shroud 150. The shroud 150 encloses the collapsible folding arms, the screen, and the whole trapezoidal volume spanned by the four folding arms attached to four corners of the screen. Any embodiment using a shroud 150 requires the collapsible, portable display to be a rear projection device because the back is covered by the shroud. The shroud 150 is made of polyester fabric or any other suitable fabric or flexible and soft material, and it is preferably of some dark color to absorb ambient light. It blocks external light to improve the contrast of the image on the screen, stops dust from getting inside any optical system of a projector that may be located in the body 130, and prevents other people from seeing the screen from the back side.

The collapsible arms have two rotatable attachment points to the body 130. A first rotatable attachment of each arm is to a fixed non-moving portion of the body 130. A second rotatable attachment of each arm is to a moveable sliding member 140 disposed on or around the main body 130 (or housing) that is described in more detail later herein. For this prototype embodiment each collapsible arm has two joints that allow for collapsing the arms and the screen as described in more detail later herein. However, as noted earlier herein, each arm may have more than two joints or fewer than two joints. Also depicted is a protective cover 160 that is used to enclose the entire display device when in the fully collapsed position.

Figure 3:
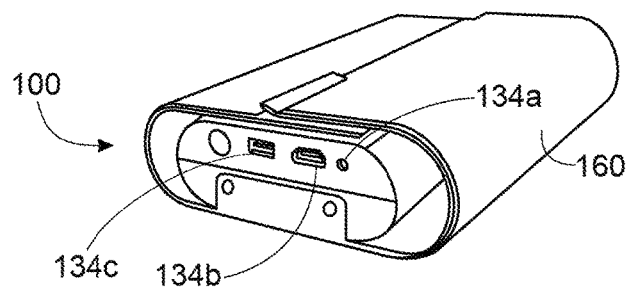
FIG. 3 depicts a rear view of the embodiment of the collapsible, portable display of the present invention of FIG. 2 in the fully collapsed position.

Referring now to FIG. 3, there may be seen a rear view of the collapsible, portable display 100 of the present invention of FIG. 2 in the fully collapsed position. More particularly, it may be seen that this embodiment 100 has a protective cover 160 fully enclosing the display device of which the main body 130 may be seen. Openings for electrical connections for providing power 134*a* and an HDMI electronic signal 134*b* representing the image to be displayed and a USB port 134 *c* may also be seen.

Figure 4:
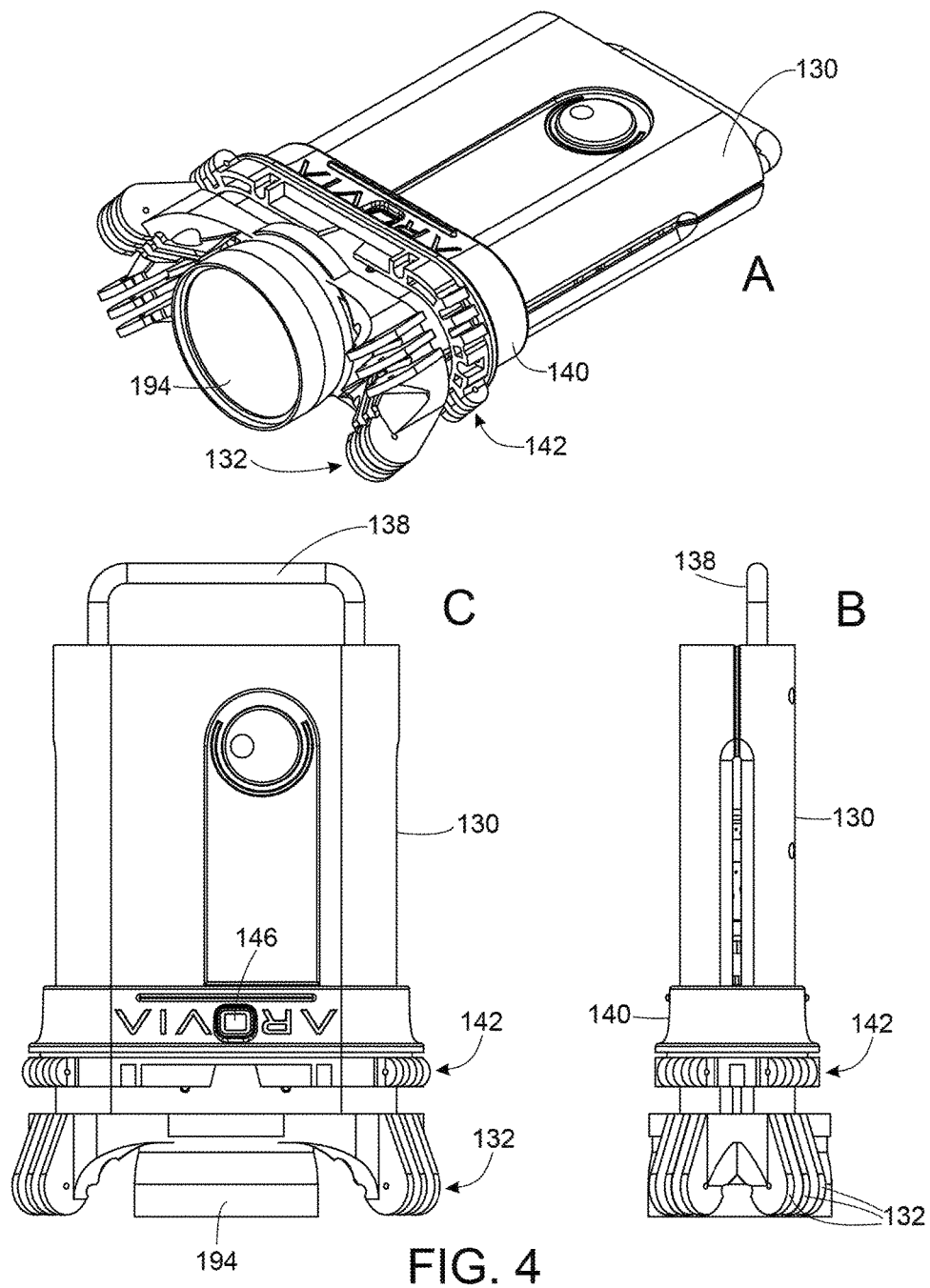
FIGS. 4A, B, and C depict perspective, side and top views of the main body and sliding member of FIG. 2.

Continuing to refer to FIG. 1, sliding member 140 is disposed on the exterior of the housing 130 and is used to push the two ends of the folding collapsible arms 122, 124, 126, 128, rotatably connected to the main body 130, toward each other and cause the arms to fully extend to position the screen in the operating popped-up position. A first end of each folding collapsible arm is connected to the housing 130 via a rotatable axis that is fixed. A second end of each folding collapsible arm is connected to a rotatable axis on the sliding member 140. When the device 100 is initially in a closed up position, the sliding member 140 is located at the back of the device main housing 130 near the handle 138 (FIG. 4). To pop-up the folding collapsible arms, the sliding member 140 is pushed forward. The sliding member 140 self-latches itself (so as to not slide back) automatically when the arms are fully extended; this may be accomplished by a simple spring loaded mechanical latch assembly. Other embodiments may employ a spring (or other mechanical energy storage device) to move sliding member 140 forward to pop-up screen 110. For these embodiments a separate latch mechanism is used to keep the device stored and is pushed or activated and released to allow the sliding member 140 to slide forward and pop-up screen 110.

Screen 110 is tensioned using the extended folding collapsible arms 122, 124, 126, 128 supporting the screen. The folding collapsible arms are similar to umbrella arms. They unfold and extend out and tension the screen 110 when the ends of the arms connected to the housing 130 and the moveable member 140 are pushed towards each other by moving the sliding member 140 forward on the housing 130. The other end of each of the folding arms 122, 124, 126, 128 is connected to the corners or edges of a rectangular screen 110 in a removable manner and provide the force to tension the screen. Depending on how tensioned the screen is desired to be, additional collapsible folding arms can be added to the four corners or edges of the screen to further stretch the screen 110. As noted later herein, two such arms may be joined together to provide the required rigidity, stiffness and strength for an arm member. Alternatively, the arm member may be constructed from a light weight but strong steel or other similar high strength metals. The arm needs to provide rigidity and strength without causing excessive weight.

Screen 110 may also have a foldable frame element that may be attached around its outer edge (not depicted) in a removable manner. The frame supports and provides tension to the screen to create a smooth projection surface. The frame can also easily collapse into a small size.

For rear projection, the material of the screen 110 is usually vinyl or silicone based translucent materials, although other similar elastic or flexible materials may be employed as a screen material. For the presently preferred silicone screens, small titanium dioxide particles are impregnated into the screen material for better luminance homogeneity. These particles preferably have an index of refraction different from, and preferably higher than, that of the actual screen material. Although other metal or similar particles with an index of refraction different from the screen material may be employed to improve image quality, the presently preferred small titanium dioxide particles are generally less than 10 microns in size. In addition to the particles to improve homogeneity, other substances such as particles with different colors, a colored paste, and a dye may be added to the screen material. These substances will further improve screen quality. For example, colored particles may be used to make the screen grey to achieve a higher contrast for projected images. These presently preferred screen materials diffuse the light coming from a projector, resist wrinkles when stored folded, and are stretchable to a tensioned state. The screen is also dust-resistant, may be removable and easily cleaned with soap, and durable. For front projection, the material of the screen would no longer be translucent but reflective, and still possess the other features of any rear projection screen material.

Referring now to FIGS. 4A, B, and C, each depicts, respectively, perspective, side and top views of the main body 130 and sliding member 140 of one embodiment like those of FIGS. 1 and 2. The position of sliding member 140 on the main body 130 is in the forward or fully extended operating position. Note that both members have mounting extensions 132, 142 at their ends for making rotatable connections with the collapsible arms. More particularly, main body member 130 has four sets of extensions 132 as may best be seen in FIG. 4A. Similarly, sliding member 140 also has four sets of extensions 142 for making rotatable connections with the collapsible arms, as may best be seen in FIG. 4A. Each of these arm mounting extensions have three fingers with each finger having an opening for containing a wire or rod member to attach the ends of a folding collapsible arm in a rotatable manner to these mounting extensions. In this manner two folding collapsible arms may be joined together in a parallel but still rotatable manner and provide more rigid, but still light weight, arms when in the fully extended operation position; an example of such a dual arm configuration is discussed later herein, with respect to FIG. 10.

FIG. 4C illustrates the handle 138 on the back of the main member 130 and the push button or mechanical release 146 in the sliding member 140. This push button is depressed to allow the sliding member 140 to move towards the handle of the main member 140 to move the screen 110 (FIG. 3) to the fully collapsed position.

The housing 130 may be configured to include a projector with or without a wide angle converter lens, or another form of a collapsible screen/display, in addition to mounting the multiple folding arms, and the exterior sliding member 140. Accordingly, for some embodiments, the housing 130 may hold any type of available, small, light-weight projector and its associated lens, provide support for the folding arms 122, 124, 126, 128, and allow the sliding member 140 to slide smoothly on the exterior of housing 130. Some embodiments may employ any projector that directly projects forward and does not use or have any mirrors, but other embodiments may use mirrors. The housing 130 also includes a handle 138 at the very back of the device. The handle allows an individual to hold the device 100 while pushing the sliding member 140 forward and for conveniently carrying the device when fully collapsed.

Figure 5:
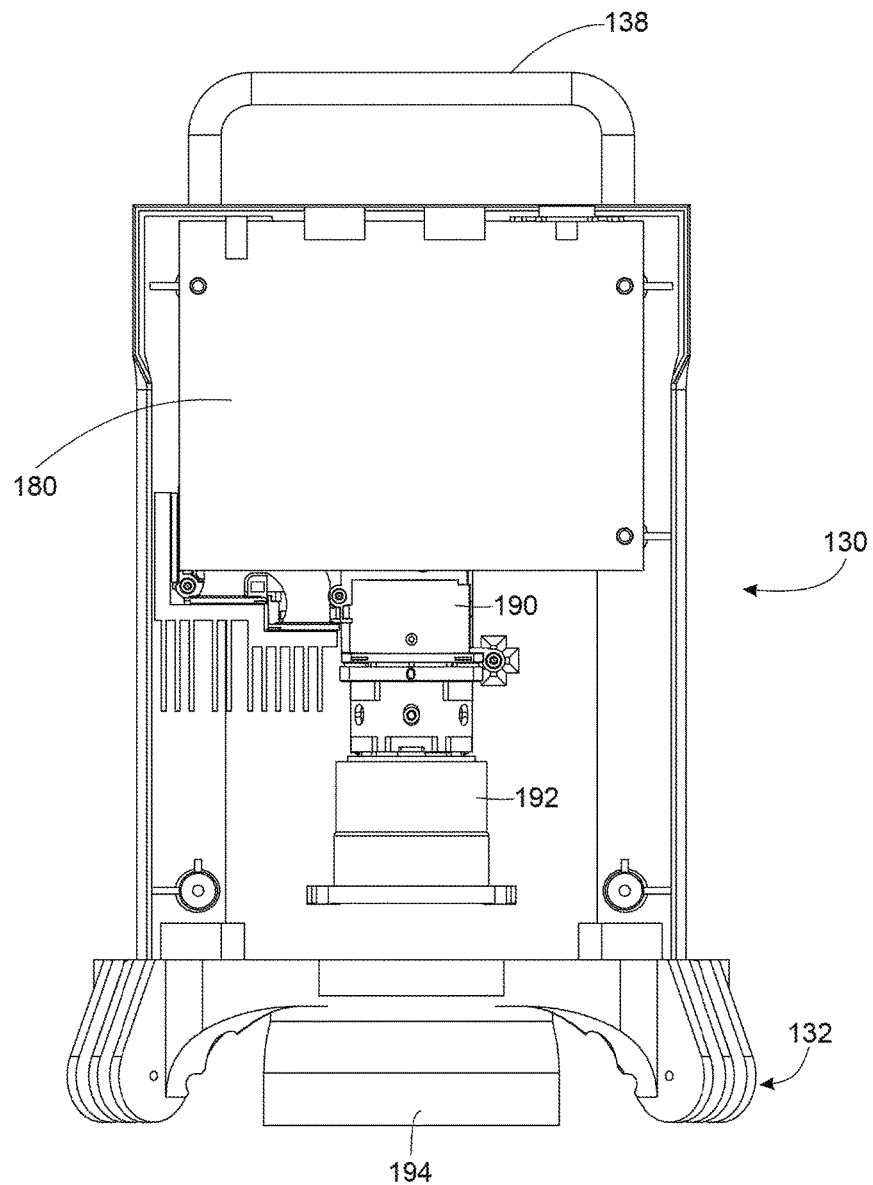
FIG. 5 depicts a top partially, cut away view of the internal components of the main body of FIG. 4.

Referring now to FIG. 5, there may be seen a top partially, cut away view of the internal components of the main body 130 of FIG. 4. More particularly, there may be seen a printed circuit board (PCB) 180 for containing electrical components needed to operate a projector engine 190. The projector in turn projects the image provided to it in an electronic format in a human comprehendible form for display on the screen 110. Lens assembly 192 is used to focus the image on the screen and is typically a part of the projector engine. A battery (not depicted) is also located in the main body underneath the PCB 180. The battery serves to operate the projector when other sources of power are unavailable. The battery is preferably a lithium ion battery. The projector is preferably a DLP based projector engine commercially available on the market, a LCOS projector, or a laser-based projector. For some embodiments the device may employ a camera (not depicted) for viewing the screen and the position of a finger or pointer on the image, and determining the location of that pointer on the image and then transmitting that to a controller to allow for a touch screen embodiment. Other touch screen embodiments may employ capacitive touch materials, or similar materials, in or on the screen.

For some embodiments a wide angle converter lens assembly 194 is optionally positioned on the main body 130 and operatively in the front of a projector engine 190 employed with the device. The lens is fixed with respect to the projector through mountings inside the main housing of body 130. The lens can shorten the throw ratio of the projector so that, in order to achieve the same screen size, the screen can now be placed closer to the projector; a wide angle lens saves table space. The projector in the device 100 can either be tilted, or have an offset of the light beam to prevent the projected light beam from being cut off by a table top, when deployed for use.

Figure 6:
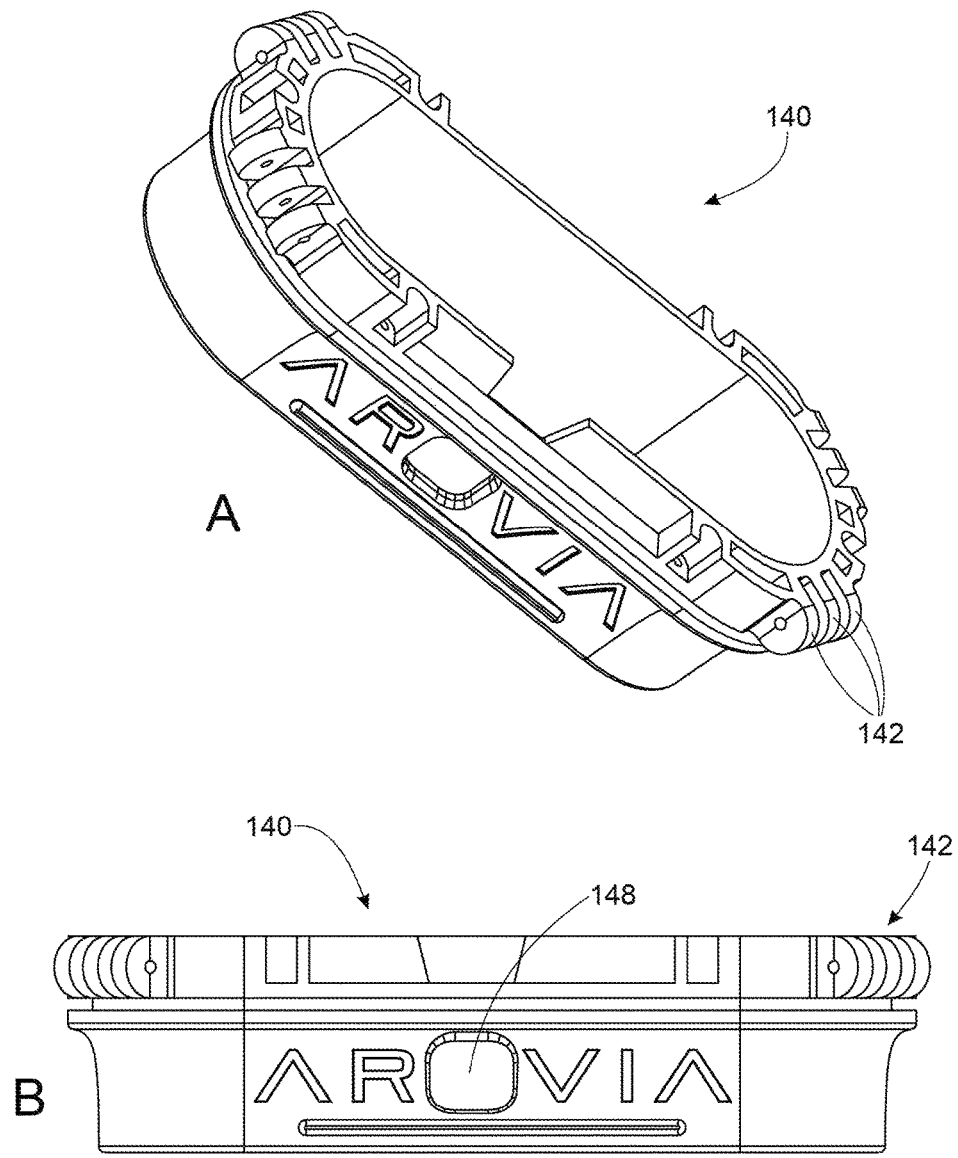
FIGS. 6A and B depict a perspective and top view of the sliding member of FIG. 2.

Referring now to FIGS. 6A and B, there may be seen, respectively, a perspective and top view of the sliding member 140 of FIG. 4. More particularly, it may be seen that sliding member 140 has four sets of extensions 142 for making rotatable connections with the collapsible arms, as may best be seen in FIG. 6A. And FIG. 6B illustrates the opening in the movable member for the push button 146 that is preferably mounted on main member 130, but may alternatively be located on member 140. This push button mechanically releases sliding member 140 from the forward operating position to allow the arms and screen to be moved to the stored collapsed operating position when sliding member 140 is moved to the rear of main body 130.

Referring now to FIGS. 7A and B, there may be seen the attachment of one of arms 126 of a prototype to the main body 130 and sliding member 140 in a rotatable manner to both the main body and the sliding member. FIG. 7A depicts the main body 130 and sliding member 140 in the forward fully extended operating position to fully extend the collapsible arm 126. FIG. 7B depicts an enlarged portion of FIG. 7A to further illustrate the rotatable connections between the extensions of the main body mounting extension member 132 and siding member mounting extension member 142 and the operative end portions of folding collapsible arm 126 members.

Figure 7:
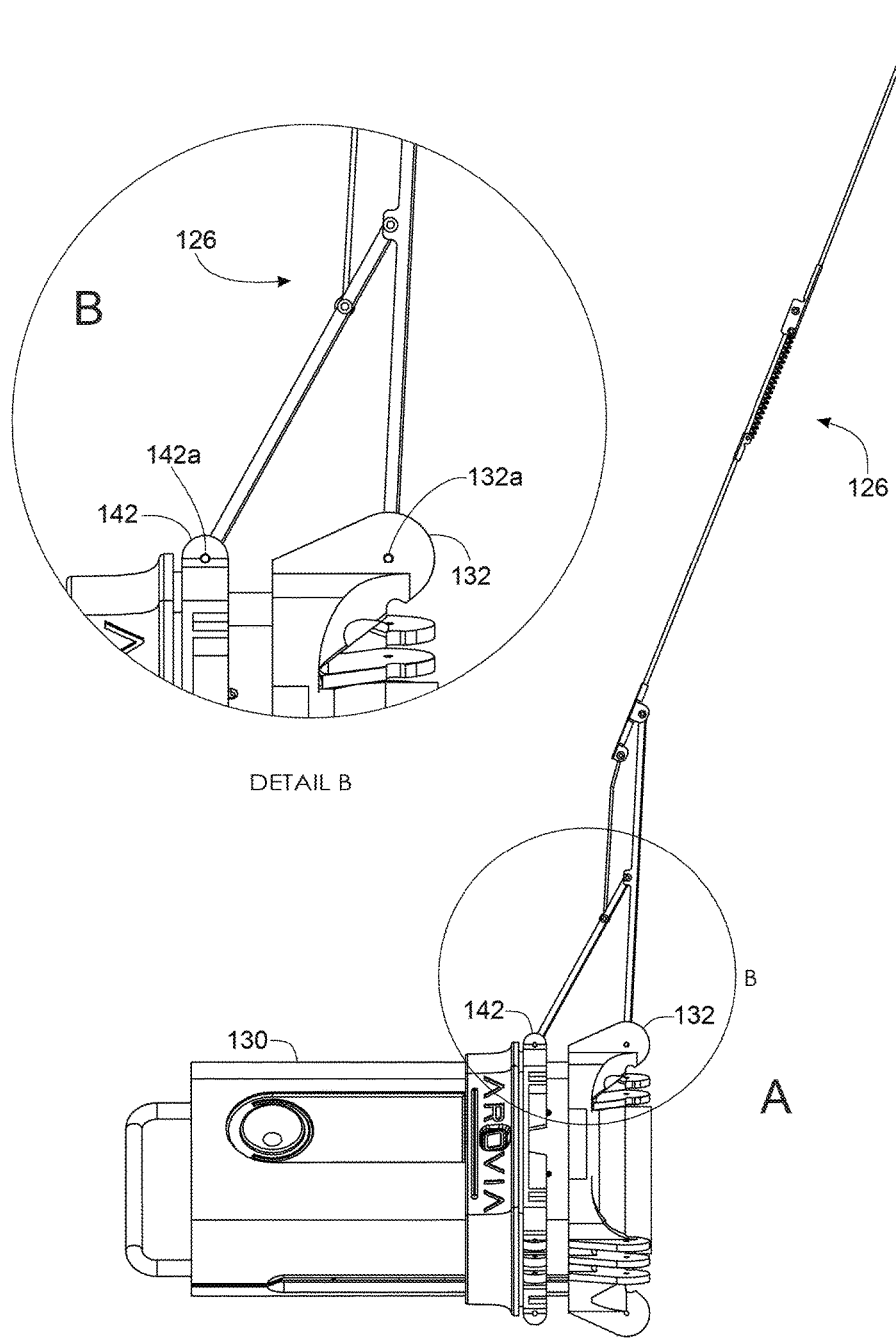
FIGS. 7A and B depict the attachment of one of the folding arms of a prototype to the main body and sliding member of one embodiment of the present invention.

Continuing to refer to FIGS. 7A and B, there may be seen the details of the attachment of a portion of one of the folding collapsible arms of a prototype to the fixed housing 130 and moveable member 140. The attachment of a short strut of an arm to the sliding member 140 of the device and the attachment of a longer strut of an arm to the fixed portion of the body 130 is depicted. As may be seen in FIG. 7, each of the struts are connected to their respective mounting extensions in a rotatable manner using openings at the end of each arm that is then held in an opening in the mounting extension of the body or moveable member for each arm. Each arm is rotatably held in place by means of a wire member or rod 132a, 142a passing through the opening at the end of each strut of an arm and the opening of the mounting extension 132 in the body 130 or the opening of the mounting extension 142 in the moveable member 140, which are each for containing the wire member 132a, and 142a, respectively.

Figure 8:
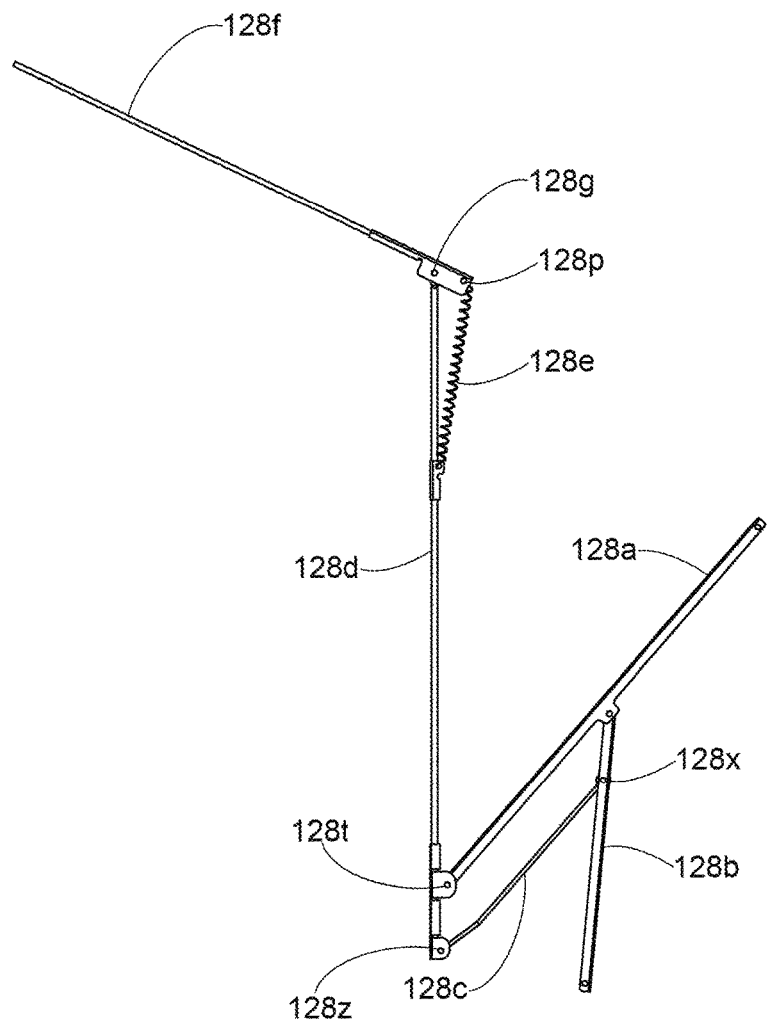
FIG. 8 depicts the details and construction of one of the folding arms of the prototype of FIG. 7 in a partially extended operating position.

Referring now to FIG. 8, there may be seen the details and construction of a representative one of the folding collapsible arms 128 in a partially extended position. In FIG. 8, there may be seen an expanded view of one of the folding arms 122, 124, 126 or 128 of the prototype of FIG. 7 in a partially extended operating position. Again, as depicted in FIG. 7, each arm has two attachment points as described herein below.

The first attachment of each arm is a long first strut 128a attached in a rotatable manner to a fixed non-moving mounting extension 132 of the main body 130, as depicted in FIG. 7. The second rotatable attachment of each arm is a shorter second strut 128b that is connected to the first strut 128a in a rotatable manner approximately half way up the first strut 128b and is also connected to moveable sliding member 140 in a rotatable manner at mounting extension 142, that have been previously described in more detail with respect to FIG. 7, hereinabove. Note also that the shorter second strut 128b has a third strut 120c connected to it in a rotatable manner at pivot point 128x and also to a fourth strut 128d that is connected to the first strut 128a in a rotatable manner at nearly one end at pivot point 128t and connected to the third strut 120c in a rotatable manner at that same end, but at pivot point 128z.

Continuing to refer to FIG. 8, it may be seen that each arm also has a fifth strut 128f connected to the fourth strut 128d in a rotatable manner at pivot point 128g, with a slight extension beyond the point of rotation 128g. The fifth strut 128f is connected in a removable manner at the other end to the screen 110 (not depicted) on one corner or edge of the screen. The fifth strut 128f is also attached at the extension, or non-screen, end to a spring 128e at pivot point 128p. Spring 128e is also connected to fourth strut 128d some distance down its length from the attachment to the fifth strut 128f. This spring connection distance is dependent upon the length of the spring in its non-tensioned state, but is depicted as approximately one third of the way down its length from the attachment to the fifth strut. Other mechanical energy storage devices may be employed in place of a spring, such as, for example, but not limited to rubber bands, pneumatic pistons, or similar devices. For some embodiments of the present invention, each of these arms is preferably an actual umbrella arm like the ones in commercially available umbrellas made by Paradise Umbrella (located in China) that are modified in accordance with the teachings of the present invention, and as discussed more fully herein with regard to FIGS. 7, 8 and 9.

Again, each of the arms 122, 124, 126 and 128 are attached to the corners of the main body and sliding member using the mounting extensions and are also attached to corresponding corners or edges of the screen 110. These umbrella arms are modified by shortening the strut that will be attached to the sliding member 140. The shortened strut allows the collapsible arms to deploy in a forward direction and roughly parallel to the main axis (running from the screen to the handle) of the main body 130 rather than to the side of the main body 130. And some struts of each umbrella arm are removed and replaced with a spring member.

Struts 128a and 128b are preferably u shaped and sized to allow for other strut members to nest inside the u shape when fully collapsed. Third strut 128c is preferably a circular wire member or rod that can retract into the u portion of the first and second struts when the struts are in the collapsed operating position. In a similar manner, the fourth strut 128d is a circular wire member or rod and the fifth strut 128f may be a circular wire member or rod. The length of the struts 128a, 128d, and 128f determine the distance from the screen to any projector employed in the main body 130 when the screen is popped-up or deployed in the fully extended operating position. Alternatively, the length of the main body 130 may determine the length of the struts in each arm and the screen size may determine the number of struts employed in each arm. For example, four strut segments may be employed instead of three to provide more distance to the screen and/or for a larger screen. Similarly, only two segments may be employed.

Continuing to refer to FIG. 8, there may be seen the details and construction of a representative one of the folding arms of the prototype of FIG. 7. The additional modification (besides 128b) to any actual umbrella arm is to add spring 128e and connect it to the fourth strut 128d some distance down its length from the attachment to the fifth strut 128f, and remove any other extra struts, if present. This spring connection distance is dependent upon the length of the spring in its non-tensioned state, but is depicted as approximately one third of the way down its length from the attachment to the fifth strut for the spring length depicted. Then for any actual umbrella arm, spring 128e is attached to the fifth strut 128f at the non-screen end.

Figure 9:
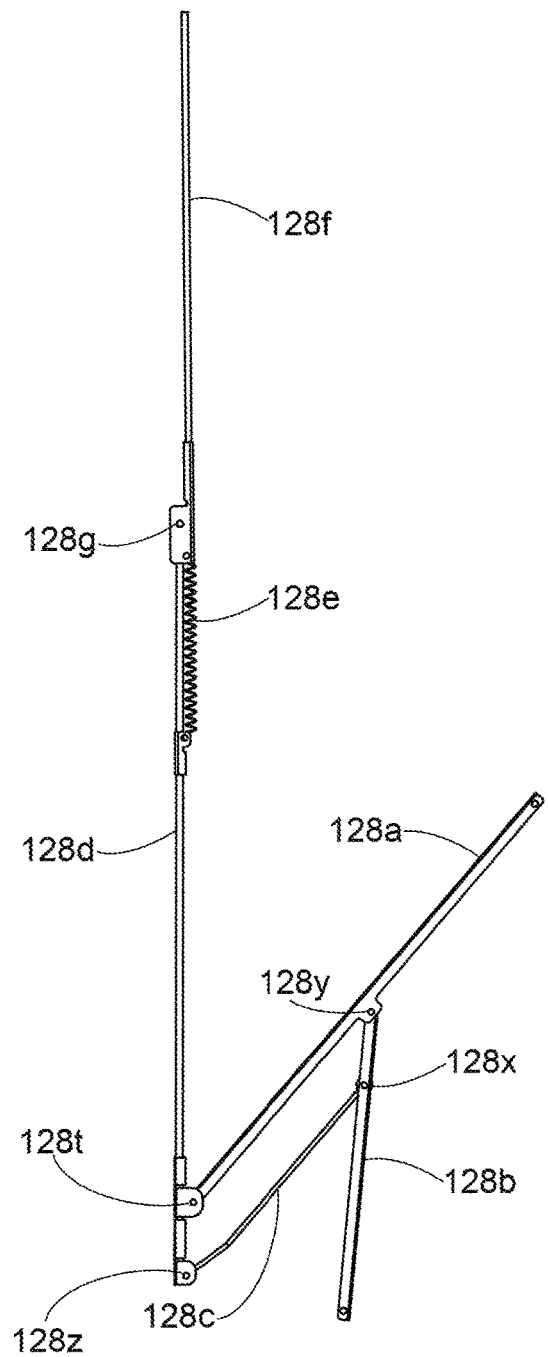
FIG. 9 depicts the details and construction of one of the folding arms of the prototype of FIG. 7 with one portion of the arm in its fully extended operating position.

Referring now to FIG. 9, a portion of a collapsible foldable arm is depicted in its fully extended operating position. More particularly, the fifth strut 128f is shown in the fully extended operating position as a result of the spring 128e returning to its shortened, non-tensioned state and its action to rotate strut 128f about the rotation point 128g to be aligned with fourth strut member 128d. First strut 128a is rotatably connected to second strut 128b at pivot point 128y. The arm struts become bent or slightly curved when fully extended as the screen is resisting the tensioning of the arms because of the screen's size and elasticity. In this manner when the other remaining strut members are in the fully extended operating position (as seen in FIGS. 1 and 2) the struts are all extended and the screen 110 is popped-up or fully deployed and tensioned in the operating position.

Although the foregoing descriptions of the four arms has treated each arm as if it were composed of a single strut, each of the arms in the presently preferred embodiment is preferably made up of two sets of parallel struts, as noted in the description of FIG. 4 and its arm attachment extensions 132, 142.

Figure 10:
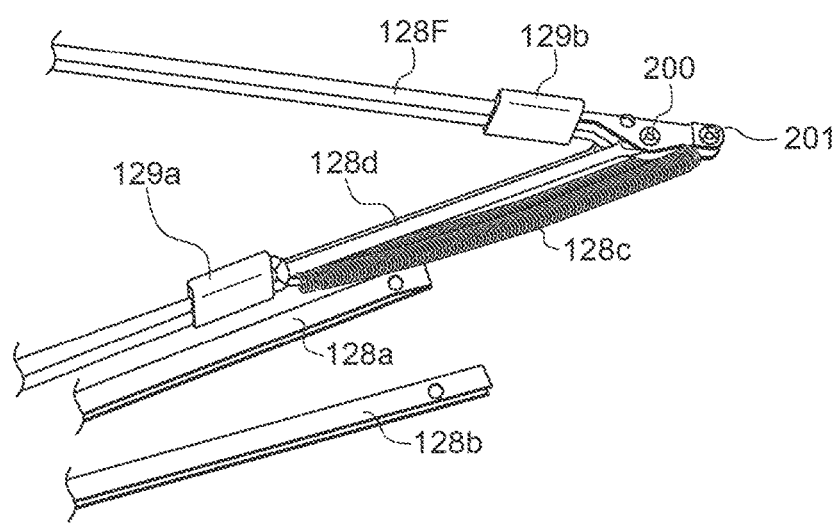
FIG. 10 depicts the details and construction of one of the folding arms of a prototype.

Referring now to FIG. 10, there may be seen the details of two sets of parallel strut arms. More particularly, it may be seen that the two arms are spaced apart by a member 129a, 129b, but connected and held together by light weight but strong materials, like for example, but not limited to, some type of tape. The attachment of the spring members 128e to struts 128f and 128d is also clearly depicted. Similarly, the openings in the struts 128a, 128b for connection to the mounting extensions is clearly depicted. The rivets 200, 201 that serve as the rotation points (pivot points 128g, 128p in FIG. 8) for the arms may be removed and replaced by a single rod that passes through the openings where the rivets were in the two arm structures to provide the same point for rotation.

Figure 11:
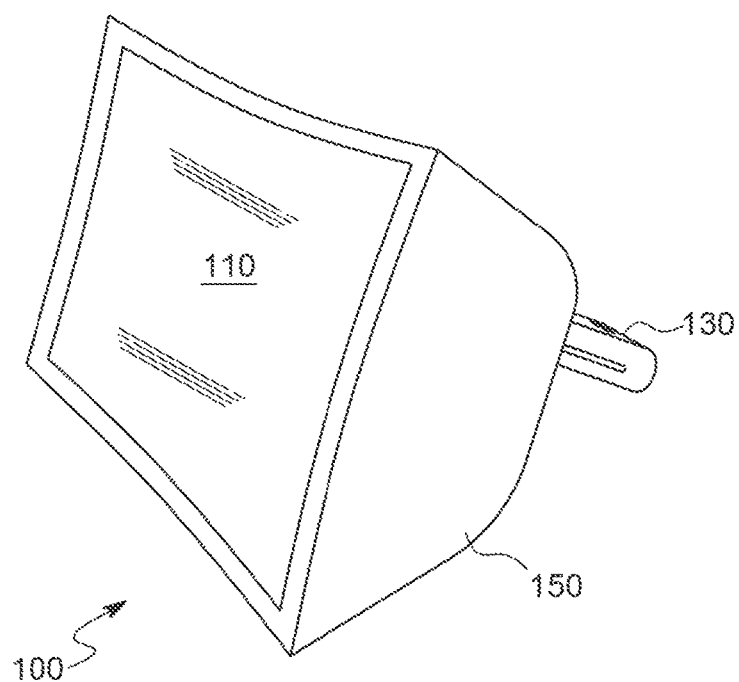
FIG. 11 depicts a side view of one embodiment of the collapsible, portable display of the present invention in the fully extended operating position.

Referring now to FIG. 11, there may be seen an example of a prototype of the device 100 of FIGS. 1 and 2. The screen 110, shroud 150 and the main body 130 are clearly seen. The attachment of the screen to the ends of the collapsible, foldable arms is also seen.

Figure 12A:
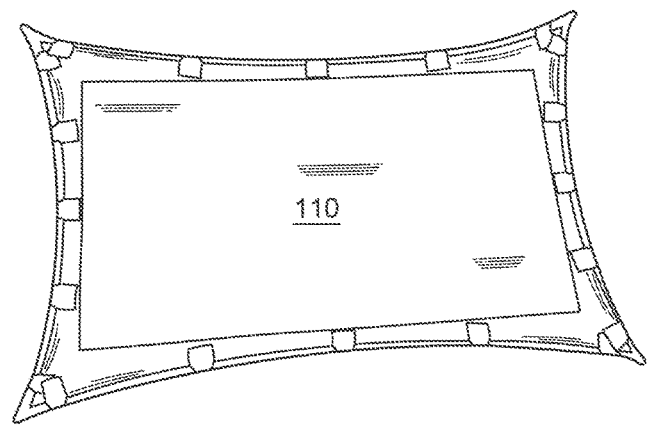
FIGS. 12A and B depict the screen member of a prototype when removed from the device in the fully extended operating position and in a partially collapsed position.
Figure 12B:
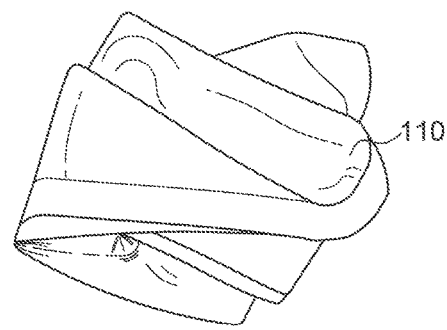

Referring now to FIGS. 12A and B, there may be seen an example of a prototype of the screen 110, for the device 100 of FIGS. 1 and 2, in the extended and tensioned popped-up or operating position and in a collapsed position, respectively. Although the screen 110 is preferably in a rectangular form factor as depicted, other form factors, such as, but not limited to, a square may be employed. For this example, the screen and its skirt member around the edges of the screen are also seen. However, use of a skirt is optional. When used, the skirt may consist of cloth with Velcro around the outermost edges for attachment to the shroud. As depicted in FIG. 12A, the screen 110 has concave edges to prevent screen wrinkling when popped-up.

Figure 13:
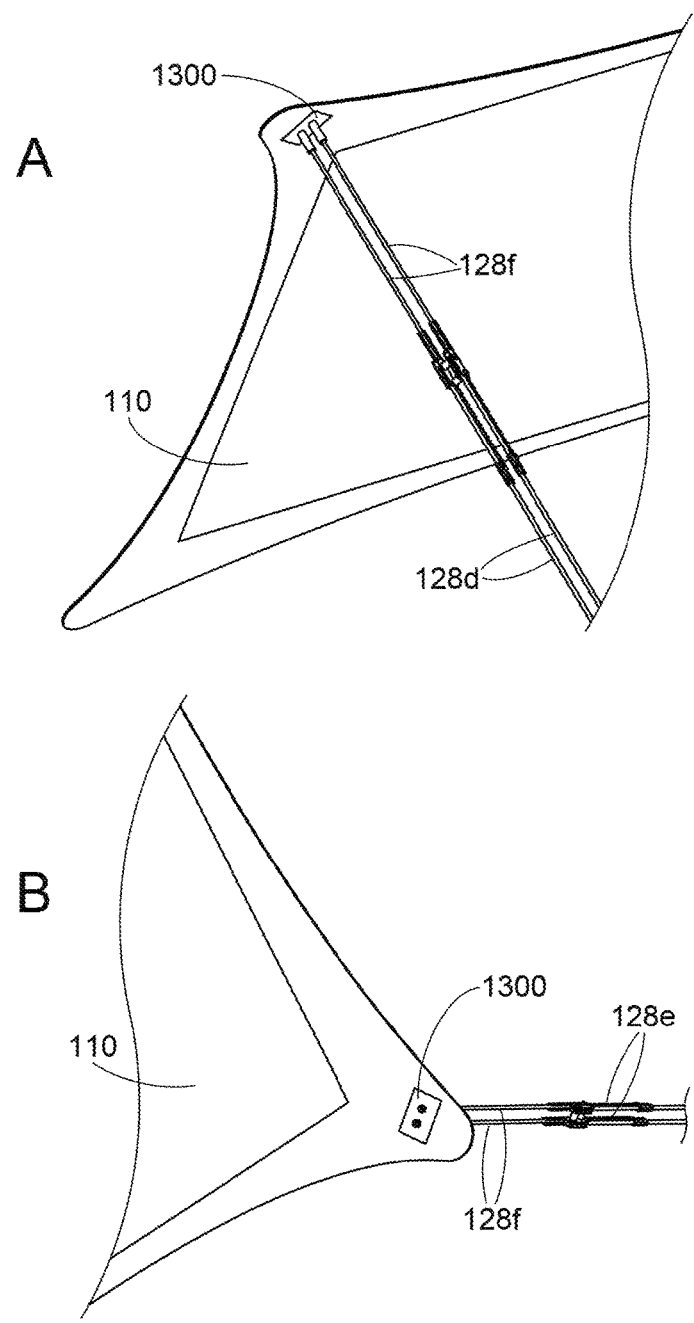
FIGS. 13A and B depict the attachment of a collapsible folding arm to the screen.

Referring now to FIGS. 13A and B, there may be seen an example of a prototype of the screen 110 and its attachment to the ends of a collapsible foldable arm from the front and back of the screen, respectively. The screen or its skirt has anchor members 1300 attached to it with openings for the arms. These anchor members disperse the stress from deployment and tensioning to prevent the screen from tearing at the points of arm connection, and are preferably plastic tabs and attached to the screen with strong glue. The screen folds neatly into a collapsed state. However, the screen 110 when in a collapsed position, along with the collapsed shroud, is used to grip struts 128f so that a user can fold back struts 128f to lay on top of the remainder of the struts 128d and tension spring member 128e when the device is to be placed in the fully collapsed operating position. Then protective cover 160 is secured around the screen and the collapsible foldable arms in their collapsed operating position.

Figure 14:
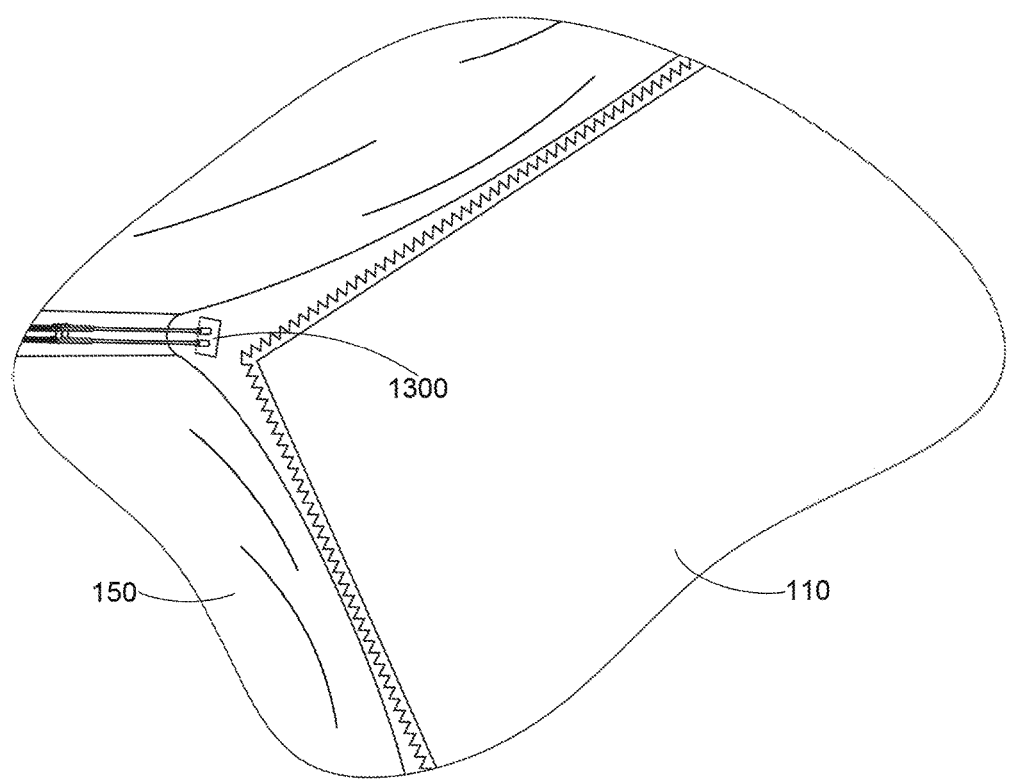
FIG. 14 depicts the attachment of the screen to the shroud.

Referring now to FIG. 14 there may be seen an example of a prototype of the screen 110 in the fully extended popped-up or operating position depicting its attachment to the shroud member 150. For the embodiment depicted in FIG. 14, the screen is sewn to the shroud. Again, as noted herein before, Velcro or other similar materials may be employed to attach the screen to the shroud.

Although the embodiments depicted and described herein have employed three strut segments for each arm, the arms may employ more or less than this number of strut segments. If a larger screen size is needed then four or more strut segments, or a telescoping arm segment as the final segment may be employed to enable the last strut segment to be extended when desired and collapsed into the arm strut when the arm is collapsed. If a smaller screen size is desired, then possibly only two strut segments may be employed. The number of strut segments may be selected depending on the main body size and the screen size. The length of the main body may determine the strut lengths and the screen size may determine the number of strut segments needed. In addition, considerations of the projector engine size, the battery size, the size of the optics employed and the PCB size may also affect the body size; and in some cases the distance the sliding member needs to travel on the body may have an impact of the body size.

Accordingly, a presently preferred embodiment is a collapsible, portable display device, having a housing member, a moveable member disposed around the exterior of said housing and moveable between two operating positions on said housing member, a screen member, a plurality of segmented arm members each having a first strut rotatably attached to said main body housing, a second strut rotatably connected to the first strut about half way up the first strut and rotatably connected to said moveable member, third strut rotatably connected to said second strut, a fourth strut rotatably connected to said third strut at one end and rotatably connected to said first strut spaced apart from the rotatable connection to said third strut and rotatably connected at the opposite end to a fifth strut, said fifth strut is connected at the other end to one corner of the screen, and said fifth strut is connected to a spring member rotatably connected to said fourth member in a location spaced apart from the rotatable connection point of said fifth and fourth members, and a shroud member connected to said housing and detachably connected to said screen member.

For a currently presently preferred embodiment the body is approximately 4⅓ inches wide, 7½ inches long, and 2¹⁄₁₀ inches thick and employs two lithium ion cells in series for the battery to obtain approximately 7 volts. The longest strut of an arm for this embodiment is approximately 150 mm.

While the present invention has been described with respect to the embodiments set forth above, the present invention is not necessarily limited to these embodiments. Accordingly, other embodiments, variations, and improvements not described herein are not excluded from the scope of the present invention. Such variations include but are not limited to new screen material, new screen particulate material, new lenses and/or mirrors, and new projectors.

Although the present invention and its advantages have been described in detail, it should be understood that various changes, substitutions and alterations can be made herein without departing from the spirit and scope of the invention as defined by the appended claims.

The invention claimed is:

1. An improved collapsible, portable display device, comprising:
   a housing member having a sliding member aligned on the exterior of said housing member and sliding along said exterior of said housing member between two operating positions,
   a collapsible screen capable of displaying an image when in an expanded popped-up operating position, and
   multiple collapsible members, including mechanical energy storing mechanisms for partial member expansion, connected to said screen and rotatably connected to both said sliding member and said housing member, and for moving said screen between collapsed and expanded popped-up positions as said sliding member slidably moves between a first position for a collapsed screen and a second position for an expanded popped-up screen by sliding along said exterior of said housing member.

2. The device of claim 1, further comprising:
   a collapsible frame member embedded in said screen edges for tensioning said screen in said expanded popped-up position.

3. The device of claim 1, wherein:
   said screen when in a collapsed state encloses said housing member and said collapsible members.

4. The device of claim 1, further comprising:
   said housing member has an opening for containing a portable projector.

5. The device of claim 1, further comprising:
   a shroud that connects to said screen and said housing member for blocking external light from said screen when said screen is in said expanded popped-up operating position.

6. An improved collapsible, portable display device, comprising:
   a housing member having a sliding member aligned on the exterior of said housing member and sliding along said exterior of said housing member between two operating positions,
   a collapsible screen capable of displaying an image when in an expanded popped-up operating position, and
   multiple collapsible members, including mechanical energy storing mechanisms for partial member expansion, connected to said screen and rotatably connected to both said sliding member and said housing member, and for moving said screen between collapsed and expanded popped-up positions as said sliding member slidably moves between a first position for a collapsed screen and a second position for an expanded popped-up screen by sliding along said exterior of said housing member, and wherein each of said collapsible members comprise, multiple struts interconnected for collapsing and extending as a function of the position of said sliding member on said housing member and wherein one portion of each of said multiple struts is positioned in an extended position by said mechanical storage mechanism.

7. The device of claim 1, wherein said the collapsible screen can be removed.

8. A collapsible display device, comprising:
   a housing member,
   a projector member having a lens assembly and operatively disposed in said housing member,
   a second lens assembly operatively disposed in said housing member,
   an electronics assembly disposed in said housing member,
   a moveable member positioned around the exterior of said housing member and moveable between two positions on said exterior of said housing member,
   a translucent screen member,
   at least four segmented arm members each having at least two main strut members for moving said screen member between a collapsed position and an extended operating position,
   each first main strut of each of said four segmented arm members is connected to said housing member in a rotatable manner,
   each second main strut of each of said four segmented arm members is connected to a corresponding first strut in a rotatable manner and connected to said moveable member in a rotatable manner,
   each of said four segmented arm members having a final main strut member deployed by a mechanical storage member and connected to said screen member, and
   a shroud member connected to said housing member and said screen member.

9. The device of claim 8, further comprising,
   a protective cover member for containing all of said housing, moveable, segmented arm and screen members of said device when said device is in a collapsed operating position.

10. A collapsible, portable display device, comprising:
    a housing member,
    a moveable member disposed around the exterior of said housing member and moveable between two operating positions on the exterior of said housing member, a plurality of segmented arm members for deploying a collapsible screen member for viewing images when in a first operating position each having:
a first strut rotatably attached to said housing member,
a second strut rotatably connected to said first strut about halfway up said first strut and rotatably connected to said moveable member,
a third strut rotatably connected to said second strut,
a fourth strut rotatably connected to said third strut at one end and rotatably connected to said first strut spaced apart from the rotatable connection to said third strut and rotatably connected at the opposite end to a fifth strut,
said fifth strut is rotatably connected at the end opposite of said connection to said fourth strut, to one corner of said collapsible screen member, and said fifth strut is connected to a spring member rotatably connected to said fourth strut in a location spaced apart from the rotatable connection point of said fifth and fourth struts,
said collapsible screen member comprising a flexible silicone or rubberized material suitable for displaying images clearly and mitigating wrinkles when properly tensioned for display by said fifth strut when in said first operating position, and
a shroud member connected to said housing member and detachably connected to said screen member.

11. The device of claim 10, further comprising,
a protective cover member for containing all of said members of said device when said device is in a collapsed operating position.

12. The device of claim 10, wherein said housing member has an opening for containing a projector member which includes a lens assembly.

13. The device of claim 1, wherein said moveable member is spring loaded to operate to deploy said screen to a fully extended popped-up operating position when released by a latching mechanism.

14. The device of claim 12, wherein said housing member is configured to contain a wide angle converter lens.

15. The device of claim 1, wherein said screen is configured to be a touch screen.

16. The device of claim 1, wherein said screen is composed of elastic or flexible silicone or rubberized material.

17. The device of claim 1, wherein said screen member is composed of elastic or flexible silicone or rubberized material and having concave edges when properly tensioned for display in said expanded popped-up operating position.

18. The device of claim 10, wherein said screen member further contains one or more of a colored particle, a colored paste or a dye.

19. A portable, collapsible screen, for use with a projector, comprising:
an elastic or flexible silicone or rubberized material suitable for displaying images clearly and mitigating wrinkles when properly tensioned for display.

20. The portable, collapsible screen of claim 19, wherein said screen has concave edges when properly tensioned for display.

21. The portable, collapsible screen of claim 19, wherein said elastic or flexible silicone or rubberized material contains embedded particulates.

22. The portable, collapsible screen of claim 19, wherein said screen further contains one or more of a colored particle, a colored paste or a dye to improve image contrast and clarity.

23. An improved collapsible, portable display device, comprising:
a housing member having a sliding member aligned on the exterior of said housing member and for sliding along said exterior of said housing member between two operating positions,
a collapsible screen for displaying an image when in an expanded operating position, and
multiple collapsible members, each including a mechanical energy storing mechanism for partial expansion of a portion of said member, connected to said screen and operatively connected to both said sliding member and said housing member for moving said screen between a collapsed and expanded popped-up position as a function of said position of said sliding member on said exterior of said housing member.

24. The device of claim 16, wherein said screen further contains one or more of a colored particle, a colored paste or a dye.

25. The device of claim 17, wherein said screen further contains one or more of a colored particle, a colored paste or a dye.

26. The portable, collapsible screen of claim 21, wherein said particulates have a different index of refraction from that of said screen material to improve image contrast and clarity.

27. The device of claim 10, wherein said collapsible screen member contains embedded particulates.

* * * * *